United States Patent
Gaal

(10) Patent No.: US 8,160,604 B2
(45) Date of Patent: Apr. 17, 2012

(54) INTEGRITY MONITORING IN A POSITION LOCATION SYSTEM UTILIZING KNOWLEDGE OF LOCAL TOPOGRAPHY

(75) Inventor: Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 796 days.

(21) Appl. No.: 10/126,035

(22) Filed: Apr. 18, 2002

(65) Prior Publication Data

US 2004/0192330 A1    Sep. 30, 2004

(51) Int. Cl.
*H04W 24/00* (2009.01)
*H04M 1/66* (2006.01)

(52) U.S. Cl. ............. 455/456.1; 455/411; 455/425

(58) Field of Classification Search .......... 455/411, 455/423, 425, 456.1–457; 342/357.06, 357.08, 342/357.12–357.16, 450, 463; 370/320, 370/317
See application file for complete search history.

(56) References Cited

U.S. PATENT DOCUMENTS

| | | | |
|---|---|---|---|
| 5,500,648 A | 3/1996 | Maine et al. | |
| 5,751,240 A * | 5/1998 | Fujita et al. | 342/70 |
| 6,282,426 B1 * | 8/2001 | Wang | 455/456.3 |
| 6,393,294 B1 * | 5/2002 | Perez-Breva et al. | 455/456.5 |
| 6,625,457 B1 * | 9/2003 | Raith | 455/456.1 |
| 6,791,959 B1 * | 9/2004 | Palmer et al. | 370/332 |
| 2001/0046870 A1 * | 11/2001 | Stilp et al. | 455/456 |
| 2002/0177947 A1 * | 11/2002 | Cayford | 701/209 |
| 2004/0198386 A1 * | 10/2004 | Dupray | 455/456.1 |

FOREIGN PATENT DOCUMENTS

| | | |
|---|---|---|
| JP | 03108681 | 5/1991 |
| JP | 07043446 | 2/1995 |
| JP | 08297158 | 11/1996 |
| JP | 2000346924 | 12/2000 |
| RU | 2150793 | 6/2000 |
| RU | 2178894 | 1/2002 |
| WO | 9944375 | 9/1999 |
| WO | WO9961934 A1 | 12/1999 |
| WO | WO0075683 | 12/2000 |
| WO | WO0158194 | 8/2001 |
| WO | 0186315 | 11/2001 |
| WO | WO03040746 | 5/2003 |

OTHER PUBLICATIONS

Wang, S. S. et al: "Mobile Location Method for Non-Line-of-Sight Situation", IEEE Communications Magazine, IEEE Service Center, Piscataway, N. J. US, vol. 2, Sep. 24, 2000, pp. 608-612.

Chadwick J. B. et al: "A Vehicle Location System Solution Approach", IEEE Plans '90: Position Location and Navigation Symposium Record, Mar. 20, 1990, pp. 127-132, XP010001106.

(Continued)

*Primary Examiner* — Marcos Torres

(74) *Attorney, Agent, or Firm* — Liberty E. Mann

(57) ABSTRACT

A system for and method of deriving a position estimate of a receiver from a plurality of parameter measurements is provided. Each measurement is derived from a correlation function, which in turn is derived by correlating a signal received at the receiver with an identification code uniquely identifying a transmitter visible to the receiver. A plurality of position estimates are derived, each from a different subset of the plurality of measurements. Based on local topography, one of the position estimates is selected as the best estimate of the position of the receiver.

22 Claims, 13 Drawing Sheets

OTHER PUBLICATIONS

Caffrey J. J. et al: "Overview of Radiolocation in CDMA Cellular Systems" IEEE Communications Magazine.

TIA/EIA-95-B;Mobile Station—Base Station Compatibility Standard for Wideband Spread Spectrum Cellular Systems (1999-03).

International Search Report-PCT/US03/011475, International Search Authority—European Patent Office—Sep. 10, 2003.

Caffrey, James J, Jr. et al.: "Overview of Radiolocation in CDMA Cellular Systems," IEEE Communications Magazine, IEEE Service Center, Piscataway, N.J. US (Apr. 1, 1998), 36(4), pp. 38-45.

* cited by examiner

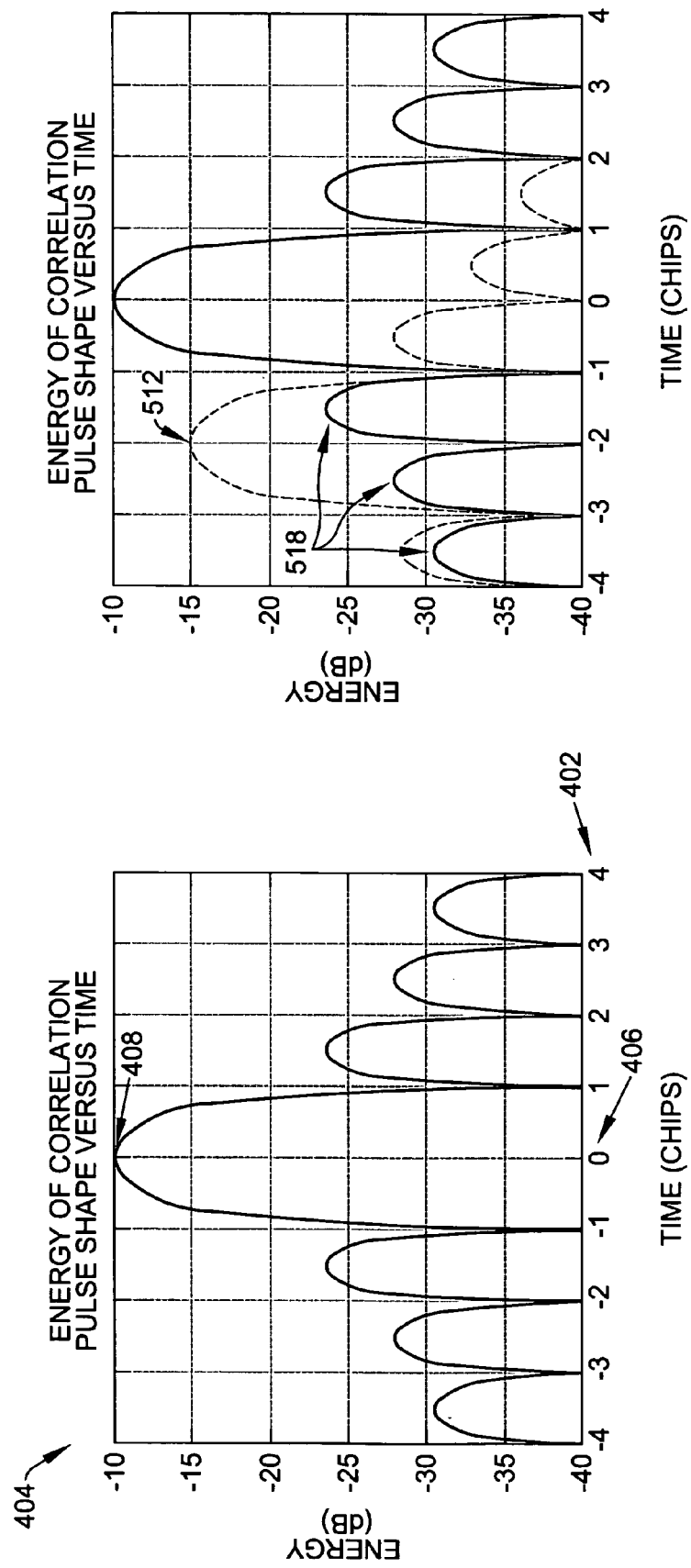

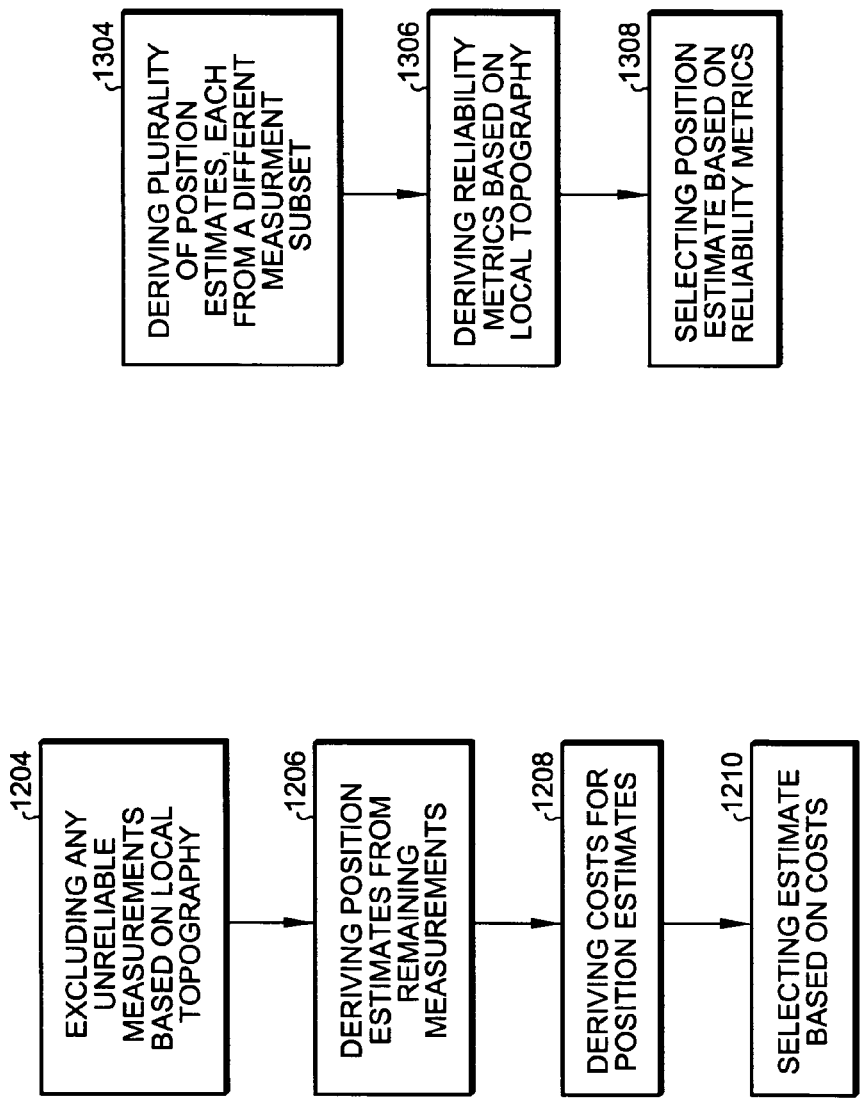

US 8,160,604 B2

INTEGRITY MONITORING IN A POSITION LOCATION SYSTEM UTILIZING KNOWLEDGE OF LOCAL TOPOGRAPHY

1. FIELD OF THE INVENTION

This invention relates to the field of integrity monitoring of measurements taken or position estimates derived in a position location system, and, more specifically, to performing integrity monitoring utilizing knowledge of local topography to account for factors such as lack of line-of-sight and multipath.

2. RELATED ART

The Global Positioning System (GPS) is a collection of satellites each of which travels in a precise orbit above the earth's surface. Each satellite transmits a signal modulated with a pseudo-noise (PN) code unique to the satellite. Each PN code comprises a predetermined number of chips. A GPS receiver receives a composite signal comprising a mixture of signals from each of the satellites that are visible to the receiver. A signal detector in the receiver detects a transmission from a particular satellite by determining the degree of correlation between the received signal and shifted versions of the PN code for that satellite. If a peak of sufficient quality in the correlation value for one of the shift offsets is detected, the receiver is considered to have detected the transmission from the satellite.

The receiver estimates its location by detecting transmissions from at least four of the satellites. For each detected transmission, the receiver uses the shift in the PN code to estimate the delay (in terms of chips or fractions of chips) between time of transmission and time-of-arrival. Given the known propagation speed of the transmitted signal, the receiver estimates the distance between itself and the satellite. This estimated distance defines a sphere around the satellite. The receiver knows the precise orbits and positions of each of the satellites, and continuously receives updates to these orbits and positions. From this information, the receiver is able to determine its position (and the current time) from the point where the spheres for the four satellites intersect.

The FCC has mandated that subscriber stations, including but not limited to mobile stations, in wireless communications systems be capable of estimating their locations in order to promote rapid responses to 911 and other emergency calls. In response to this mandate, efforts are underway to equip subscriber stations with the means to estimate their locations from GPS satellite transmissions. Moreover, since base stations or sectors in wireless communications systems transmit pilot signals modulated with unique PN codes, these efforts also include allowing subscriber stations to estimate their locations from the transmissions of multiple base stations or sectors, or combinations of base stations or sectors and GPS satellites. The use of base stations or sectors to estimate position is referred to as Advanced Forward Link Trilateration (AFLT); and the use of both GPS satellites and base stations or sectors at the same time is referred to as hybrid position location.

Referring to FIG. 1, a signal detector within subscriber station 100 attempts to detect the transmission of a reference source, whether it be a satellite, base station or sector, from the peak of a correlation function which is derived by multiplying the received signal (which is typically a composite signal comprising a mixture of the transmissions from multiple reference sources, such as base stations/sectors 102a, 102b, 102c, and/or satellites 106a, 106b, 106c) with shifted versions of the PN code for the reference source within a range defined by a predetermined search window, and then, for each shifted PN code, adding the multiplied values over a predetermined integration time to achieve a value representative of the degree of correlation between the received signal and the shifted PN code. If a peak is detected, the signal detector may then derive measurements of one or more parameters, such as time-of-arrival, from the peak. Once four or more such measurements have been obtained, an estimate of the position of the subscriber station 100 may be obtained.

At least four measurements are required to determine a position estimate. If more than four measurements are obtained, the position estimate is considered to be over-determined. In an over-determined situation, it is possible to derive multiple position estimates, each from different subsets of the measurements. Further, if a measurement subset itself is over-determined, then it is possible to check that subset for self-consistency. In a process known as integrity monitoring, a quantitative measurement of the consistency between measurements in a subset is determined. The quantitative measurement may be associated with the position estimate derived from that subset and be referred to as the 'cost' of the position estimate. These costs may be useful in selecting one of the estimates as the best estimate.

This process may be further explained with reference to FIG. 2. There, it is assumed that measurements have been obtained from reference sources 202a, 202b, 202c, 202d, 202e, 202f and that three position estimates, $pe_1$, $pe_2$, and $pe_3$, have been obtained from different subsets of the measurements. In particular, as illustrated, $pe_1$ is assumed to be derived from measurements taken from reference sources 202a, 202b, 202c, 202d and 202e; $pe_2$ is assumed to be derived from measurements taken from reference sources 202a, 202b, 202c, 202d, and 202f; and $pe_3$ is assumed to be derived from measurements taken from reference sources 202b, 202c, 202d, 202e, and 202f.

In one example, the cost is the RMS error residual of the measurements used in deriving the position estimate. In this example, the cost associated with the first estimate, $pe_1$, may be expressed as follows:

$$\text{cost}_1 = \sqrt{\begin{aligned}(r_a - d_{a,pe1})^2 + (r_b - d_{b,pe1})^2 + (r_c - d_{c,pe1})^2 + \\ (r_d - d_{d,pe1})^2 + (r_e - d_{e,pe1})^2\end{aligned}}, \quad (1)$$

where $r_a$, $r_b$, $r_c$, $r_d$, and $r_e$ are the ranges measured between the subscriber station and reference sources 202a, 202b, 202c, 202d, 202e, respectively; and $d_{a,pe1}$, $d_{b,pe1}$, $d_{c,pe1}$, $d_{d,pe1}$, and $d_{e,pe1}$ are the computed distances between position estimate $pe_1$ and reference sources 202a, 202b, 202c, 202d, and 202e, respectively.

Similarly, in this example, the cost associated with the second estimate, $pe_2$, may be expressed as follows:

$$\text{cost}_2 = \sqrt{\begin{aligned}(r_a - d_{a,pe2})^2 + (r_b - d_{b,pe2})^2 + (r_c - d_{c,pe2})^2 + \\ (r_d - d_{d,pe2})^2 + (r_f - d_{f,pe2})^2\end{aligned}}, \quad (2)$$

where $r_f$ is the range measured between the subscriber station and reference source 202f; and $d_{a,pe2}$, $d_{b,pe2}$, $d_{c,pe2}$, $d_{d,pe2}$, and $d_{f,pe2}$ are the computed distances between position estimate $pe_2$ and reference sources 202a, 202b, 202c, 202d, and 202f, respectively.

The cost associated with the third estimate, pe3, may be expressed as follows:

$$\cos t_3 = \sqrt{\begin{array}{c}(r_b - d_{b,pe3})^2 + (r_c - d_{c,pe3})^2 + (r_d - d_{d,pe3})^2 + \\ (r_e - d_{e,pe3})^2 + (r_f - d_{f,pe3})^2\end{array}}, \qquad (3)$$

where $d_{b,pe3}$, $d_{c,pe3}$, $d_{d,pe3}$, $d_{e,pe3}$, and $d_{f,pe3}$ are the computed distances between position estimate $pe_3$ and reference sources 202b, 202c, 202d, 202e, and 202f, respectively.

In a conventional position location system, the position estimate corresponding to the lowest cost is selected as the best position estimate. However, there are many cases where the lowest cost estimate is not in fact the best estimate. Consider, for example, a scenario where more than one of the measurements used to compute the lowest cost estimate have been corrupted due to factors such as multi-path and lack of line of sight, but the measurements used to determine a higher cost estimate are not so corrupted. In this scenario, the higher cost estimate might in fact be the best position estimate.

If the corrupted measurements could be identified, accuracy could be improved by excluding from consideration position estimates based on corrupted measurements. However, with the conventional approach, if less than a total of six measurements are available, or if more than one of the measurements have been corrupted, then it is generally impossible to identify which of the measurements have been corrupted.

SUMMARY

The invention provides a method of deriving a position estimate of a receiver from a plurality of parameter measurements. Each of the parameter measurements is derived from a correlation function, which in turn is derived by correlating a signal received at the receiver with an identification code uniquely identifying a transmitter visible to the receiver.

A first embodiment comprises deriving a plurality of position estimates, each from a different subset of the plurality of measurements. One of the position estimates is then selected based on local topography.

A second embodiment of the method comprises deriving a plurality of position estimates, each from a different subset of the plurality of measurements. The cost of each of the position estimates is then derived. The cost represents the degree of consistency of the measurements used in deriving the position estimate. Once obtained, the costs are then refined based on local topography. One of the position estimates is then selected based on the refined costs.

A third embodiment of the method comprises using local topography to exclude any of the plurality of measurements which are unreliable. A plurality of position estimates are then derived, each from a different subset of the remaining measurements. Costs for each of the position estimates are then determined, and one of the position estimates is then selected responsive to the costs.

A fourth embodiment of the invention comprises deriving a plurality of position estimates, each from a different subset of the plurality of measurements. A reliability metric is then derived for each of the position estimates based on local topography. One of the position estimates is then selected based on the reliability metrics.

In one implementation, the identification codes are pseudo noise (PN) codes, and the measurements are time-of-arrival measurements. In this implementation, a plurality of position estimates are derived, each from a different subset of the time-of-arrival measurements.

Based on local topography, a reliability metric for each position estimate is derived using the following procedure. For each time-of-arrival measurement from which the position estimate is derived, based on local topography, the expected peak amplitude of the correlation function corresponding to a line of sight transmission is estimated. This value is then compared with the amplitude of the earliest non-sidelobe peak of the actual correlation function. The reliability metric is then adjusted based on the comparison.

For example, if the actual peak amplitude exceeds the expected peak amplitude, a multi-path condition could be present, and the reliability metric decreased to reflect that. As another example, if the actual peak amplitude is less than expected, there might be unexpected obstacles in the path of the transmission from the transmitter, and the reliability metric decreased to reflect that. This step is repeated for each of the measurements from which the position estimate is derived. The result is the reliability metric for the position estimate.

Each of these methods may be tangibly embodied as a series of processor executable instructions stored a memory accessible by the processor. Furthermore, systems are possible comprising a processor and the foregoing memory, wherein the memory is accessible by the processor, and the processor is configured to access and execute the instructions stored thereon.

Such a system may be used in a variety of environments or applications. For example, in one application, such a system forms a part of a subscriber station and is configured to locate the position of the subscriber station from one or more transmissions from base stations, sectors, GSP satellites, or any combination thereof. In another application, such a system forms part of a position determination entity (PDE), which is configured to locate the position of a subscriber station from measurements obtained by the subscriber station. More specifically, the subscriber station obtains the measurments from one or more transmissions from base stations, sectors, GPS satellites, or any combination thereof, and provides them to the PDE, which then estimates the position of the subscriber station.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 4 is a time domain representation of an example of a correlation function for a CDMA pilot signal.

FIG. 5 is a time domain representation of an example of a correlation function for a CDMA pilot signal which reflects the effects of a multi-path condition

FIG. 12 is a simplified flowchart illustrating a third embodiment of a method according to the invention in which any unreliable measurements are excluded from consideration based on consideration of local topography.

FIG. 13 is a simplified flowchart illustrating a fourth embodiment of a method according to the invention in which a position estimate is selected responsive to reliability metrics determined based on consideration of local topography.

DETAILED DESCRIPTION

Example Application

Figure 1:
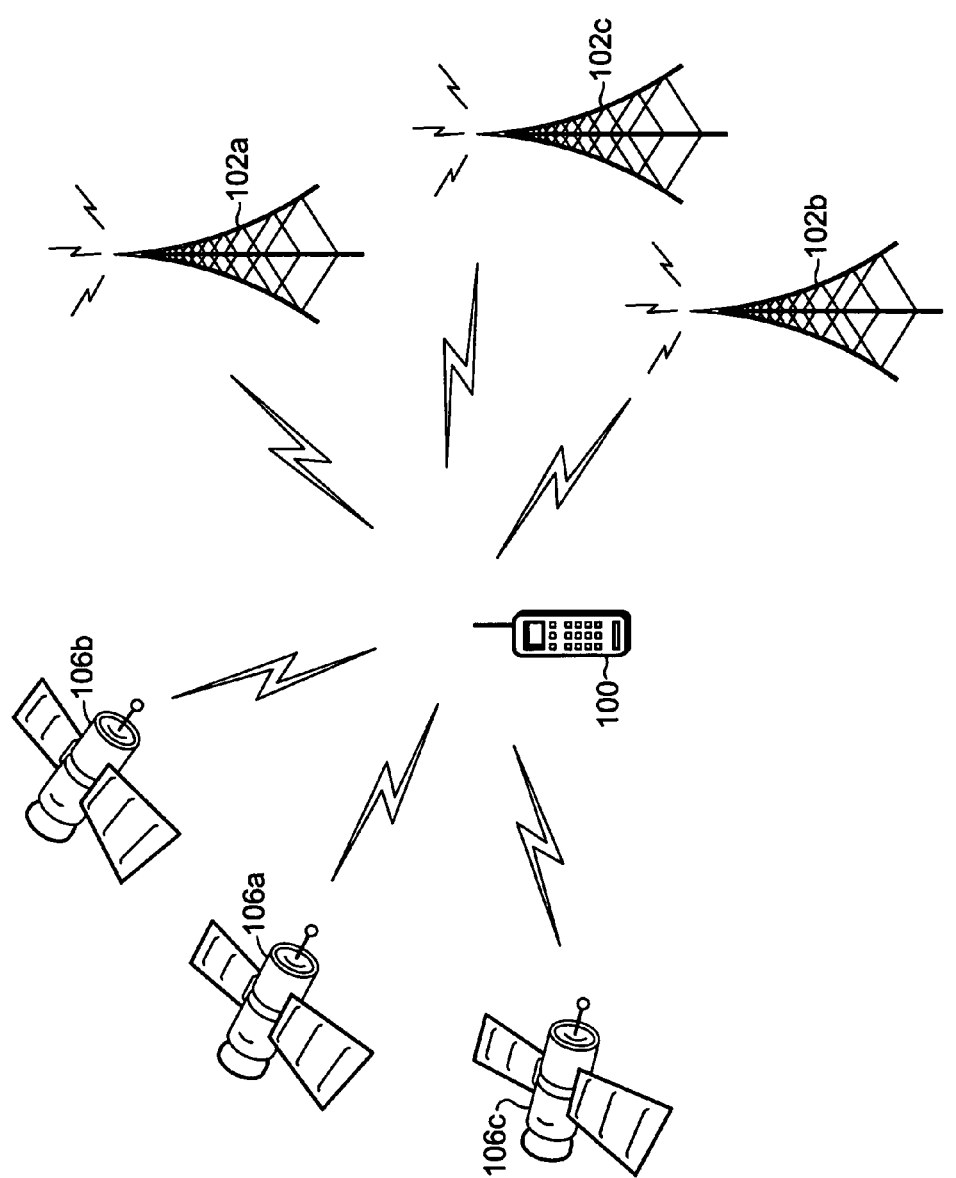
FIG. 1 is a simplified diagram of an example position location system.
Figure 2:
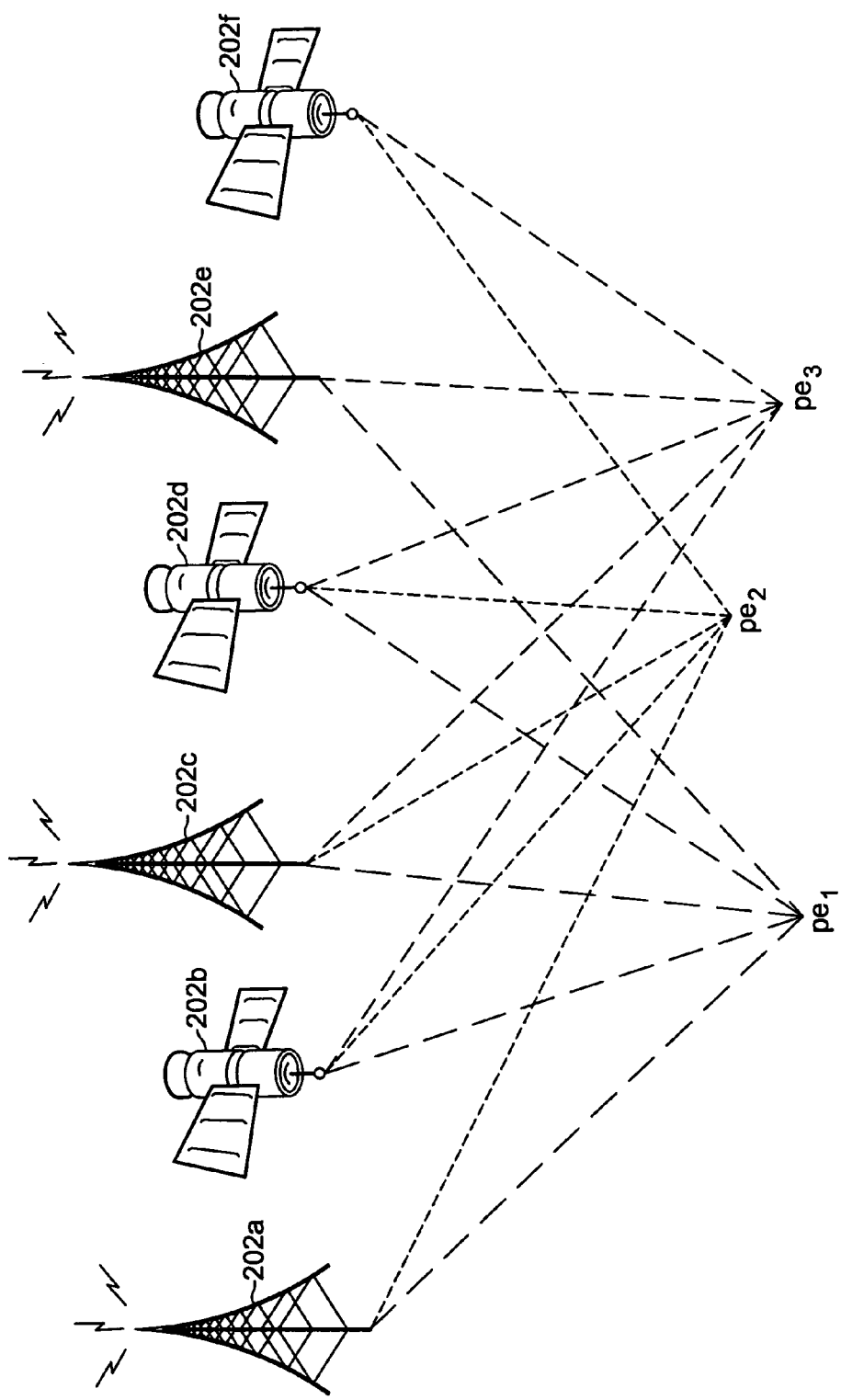
FIG. 2 illustrates the process of determining a plurality of potential position estimates each from different measurement subsets.
Figure 3:
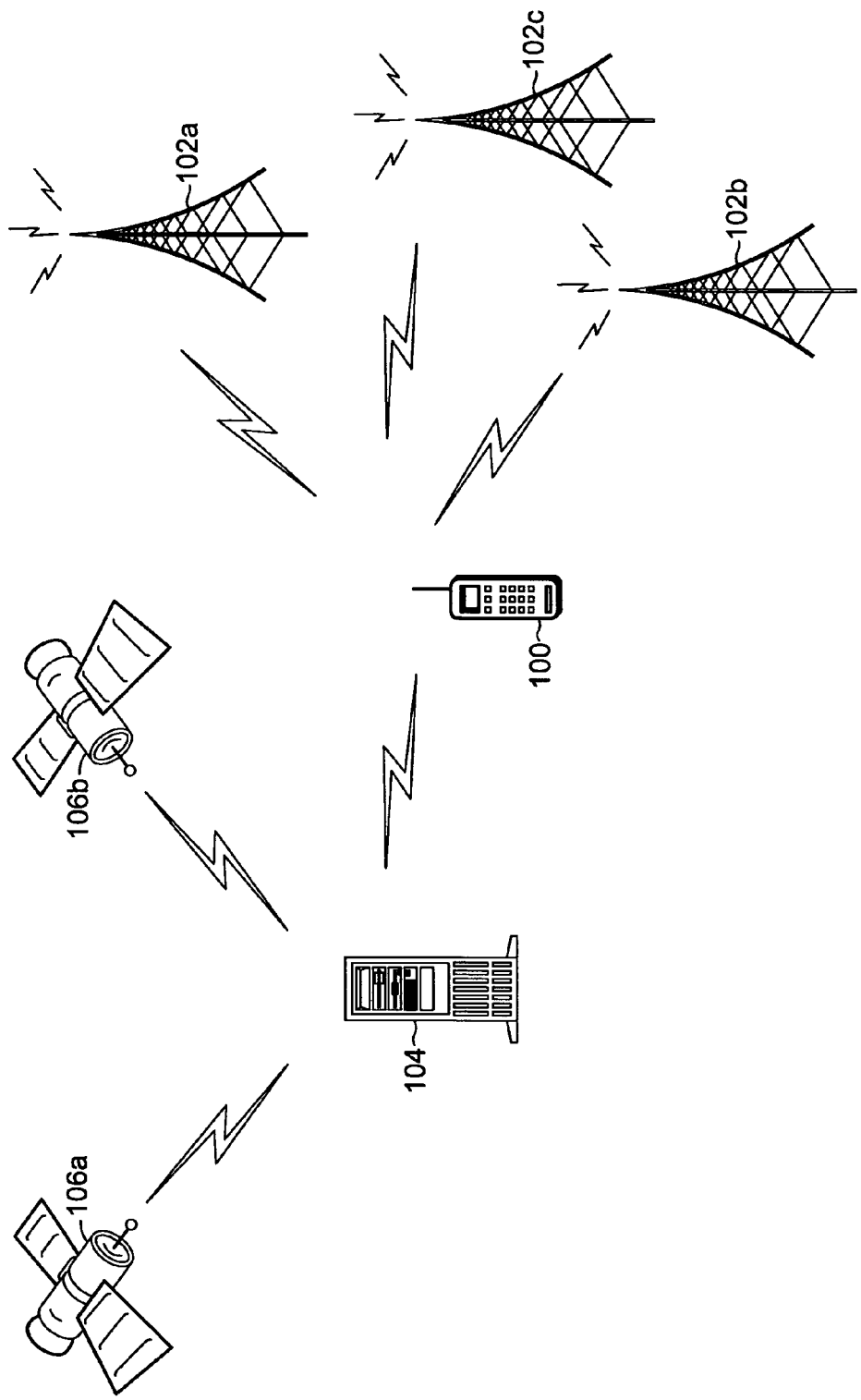
FIG. 3 is a simplified diagram of an example position location system representing an example application of the subject invention.

Referring to FIG. 3, an example application of the invention is illustrated. In this example application, subscriber station 100 is a component of a wireless communication system such as but not limited to cellular, fixed wireless, PCS, and satellite communications systems. Moreover, the wireless communications system may provide for multiple access in accordance with CDMA, TDMA, FDMA, or GSM multiple access protocols, or combinations thereof.

One or more base station(s) or sector(s) 102a, 102b, and 102c are employed in the wireless communications system. Each base station or sector 102a, 102b, 102c transmits a pilot signal which is modulated with a repeating pseudo-random noise (PN) code which uniquely identifies that base station or sector. For IS-95 compliant CDMA systems, the PN code is a sequence of 32,768 chips, which is repeated every 26.67 msec.

One or more GPS satellites 106a, 106b may also be visible to the subscriber station 100 or position determination entity (PDE) 104. Each of the GPS satellites also transmits a signal which is modulated with a repeating PN code which uniquely identifies that satellite. In current GPS systems, the PN code is a sequence of 1,023 chips, which is repeated every millisecond.

A parameter estimator within subscriber station 100 is configured to estimate various parameters of the pilot signals transmitted from the base stations or sectors 102a, 102b, and 102c and/or the signals transmitted from the GPS satellites 106a, 106b. Such parameters may include TOA, time of transmission, energy per chip divided by total received power ($E_c/I_0$) and reliability metrics for any of the foregoing, including but not limited to root mean squared error (RMSE) for one or more of these parameters, such as the TOA estimate.

The parameters, once estimated, and the reliability metrics if computed, are provided to PDE 104, which estimates the location of subscriber station 100 responsive thereto. (The PDE 104 may be a server in a public computer network such as the Internet or other TCP/IP network, a private network, or some other network.) As part of this process, the PDE 104 may weight the parameters by their corresponding reliability metrics and estimate the location of subscriber station 100 using the weighted parameters. Once estimated, the position of the subscriber station 100 may be downloaded to it, or the position information may be transmitted to an emergency operator in the event of a 911 or other emergency call.

The PDE 104 may estimate the location of the subscriber station 100 from measurements derived from transmissions from base stations or sectors 102a, 102b, and 102c, or, to increase accuracy, from the combined measurements of one or more of the base station(s) or sector(s) 102a, 102b, 102c and one or more of the GPS satellite(s) 106a, 106b.

The PDE 104 may provide other forms of assistance to the subscriber station 100. For example, PDE 104 may continuously track the GPS satellites, and provide assistance to the subscriber station 100 in locating the signals transmitted from them. This avoids the need to have the subscriber station 100 undergo time-consuming "cold start" procedures for locating the satellites when it is powered up.

one embodiment, the parameter estimator within subscriber station 100 comprises correlation logic and analysis logic. For purposes of this disclosure, the term "logic" means hardware, software, or a combination of hardware and software. A composite signal comprising a combination of multiple pilots signals transmitted from multiple base stations, sectors, and/or GPS satellites is received by the correlation logic. Each pilot signal is modulated with an identification code which, in one example, is a PN code. The identification code may be modulated onto the signal on a one-time or repeating basis. The identification code used to modulate a pilot signal uniquely identifies the source of the pilot signal, whether it be a base station, sector, or a GPS satellite.

The correlation logic is configured to determine, using an integration time I, the correlation between the composite signal and shifted versions of an identification code. Obviously, the greatest degree of correlation will be exhibited if the identification code used by the correlation logic matches that modulated onto a pilot signal which is contained in the composite signal. The correlation logic outputs a correlation function which represents the correlation within a search window between the signal and shifted versions of the identification code.

In one example, each sample of the composite signal S is a complex number having in-phase (I) and quadrature (Q) components, and the signal S comprises a plurality of pilot signals each modulated with a PN code. In one implementation, the correlation logic determines a correlation value C, which depends on the PN code and the shift s in the PN code which are used. This correlation value is coherent, i.e., retains phase information, and is a complex number which can be expressed as follows:

$$C(PN, s) = \sum_{i=k+0}^{k+N-1} PN(i-s) \cdot S(i) \quad (4)$$

where N is the (coherent) integration time in terms of chips, S(i) are samples of the received signal, and k is an arbitrary start time. In this implementation, the integration time I is the coherent integration time N.

In a second implementation, the correlation logic determines a correlation value C, which is a real number and is derived by non-coherently, i.e., not retaining phase information, combining M successive coherent integrations, each conducted over N chips. In this implementation, the correlation value C may be expressed as follows:

$$C(PN, s) = \sum_{j=1}^{M} \sum_{i=k+(j-1)N}^{k+jN-1} |PN(i-s) \cdot S(i)| \quad (5)$$

In this implementation, the integration time I is the product of N and M.

The range of the shift s that is tested is the search window W. The W values C(PN, s) which result together form a correlation function F(PN, s), which represents the degree of correlation between the signal S and the shift s of the PN code (where the shift s is expressed in terms of chips) over a desired search window W. In the case where the PN code is repeatedly modulated onto the signal, the correlation function F(PN, s) will be periodic.

FIG. 4 illustrates an example of a correlation function F(PN, s) for a pilot signal in a CDMA wireless communication system. The window size (in terms of chips) in this example is 8, and the window is assumed to be centered at the origin 406. The horizontal axis 402 represents the shift of the PN code (expressed in terms of chips), and the vertical axis 404 represents the correlation function F(PN, s) (expressed in terms of Energy(dB)). As illustrated, the peak 408 of the function in this example is located at the origin 404. This correlation function may constitute a component pulse in a real world correlation function.

If the peak 408 of the correlation function is sufficiently high and sufficiently distinguishable from noise and other distortions (to be discussed) that the risk of a false positive is reduced to an acceptable level, then a successful measurement has been obtained. The correlation logic may repeat this process with other PN codes until at least four measurements have been successfully obtained.

For each measurement that has been successfully obtained, the analysis logic may then derive a propagation time estimate which, in one example, is the time/distance associated with the earliest non-sidelobe peak of the correlation function within the search window. The time/distance associated with the earliest non-sidelobe peak is generally used since it often corresponds to a line-of-sight transmission, and the peak associated with the line-of-sight transmission is usually needed for an accurate TOA estimate. The analysis logic may also derive a reliability metric such as RMS error for the TOA estimate, and weight the TOA estimate with a weight derived from the reliability metric.

The analysis logic may provide PDE 104 with four or more weighted TOA estimates. Responsive to this information, PDE 104 estimates the location of subscriber station 100, and then downloads this information to the subscriber station 100.

The subject invention may be employed within PDE 104 and utilized for the purpose of estimating the location of the subscriber station 100 responsive to the measurements (weighted or unweighted) which have been provided to it. However, it should be appreciated that other applications are possible where the position determination function is performed directly within the subscriber station 100 or within another entity, such as one or more of the base stations or sectors 102a, 102b, 102c. In that event, the subject invention may be employed within any of these other entities within the wireless communications system.

Background Regarding the Effects of Multi-path and/or Lack of Line of Sight

FIG. 5 illustrates an example of a correlation function F(PN, s) for a pilot signal in a CDMA communications system where the effects of multi-path are depicted. The correlation function for a weaker earlier-in-time independent arrival, represented in the figure with a dashed line, is superimposed on the correlation function for a stronger independent arrival, which is represented in the figure with a solid line. The additive combination of these two correlation functions might represent the correlation function which is derived from a real world composite signal subject to the effects of multi-path or which is a multi-path signal. For purposes of this disclosure, an "independent" arrival includes one of multiple signals from different sources which arrive at a destination as well as one of multiple renderings of the same signal which arrive at a destination through different routes.

Figure 6:
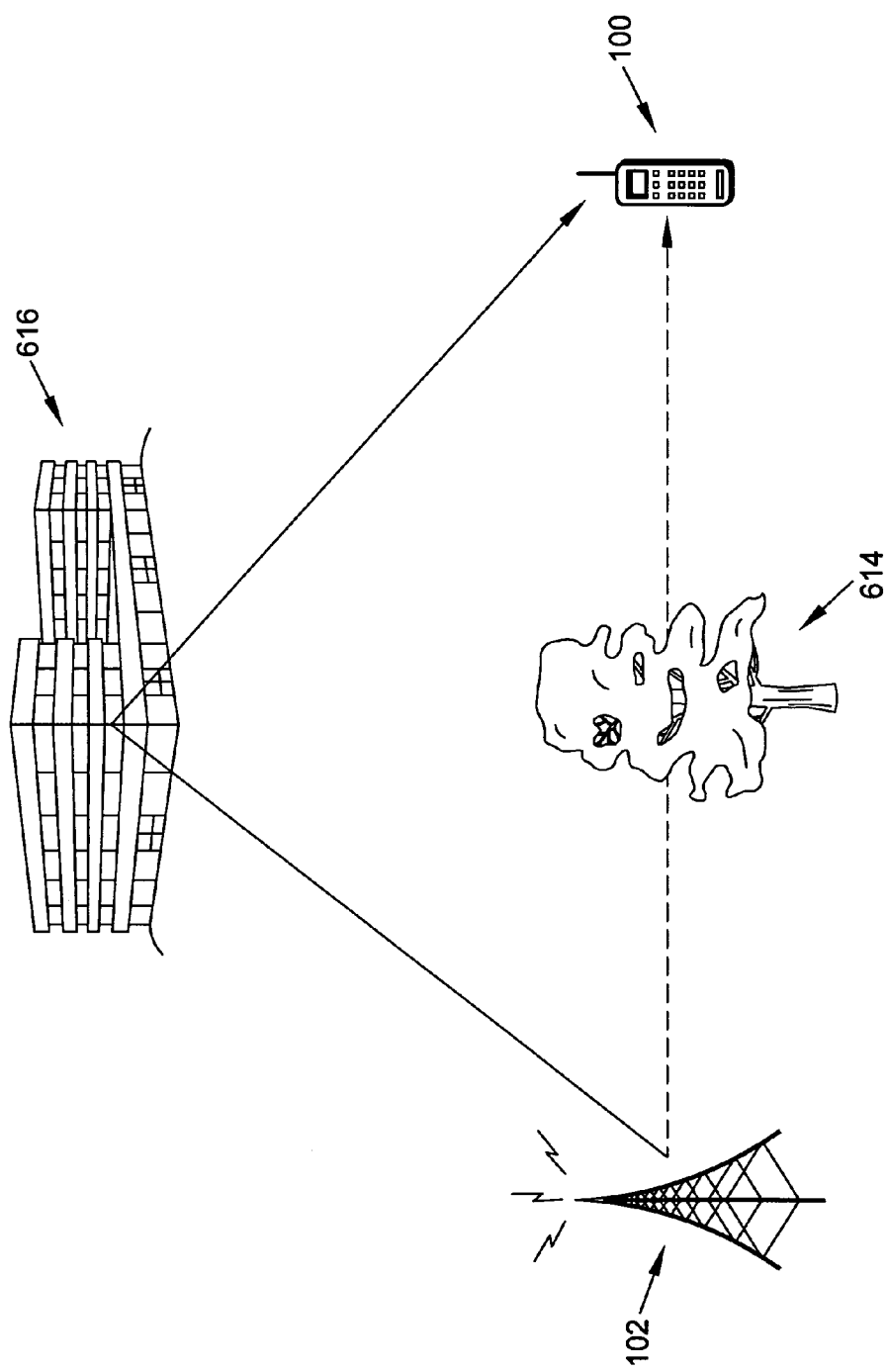
FIG. 6 illustrates an example scenario which might give rise to the correlation function of FIG. 5.

FIG. 6 illustrates a situation which might give rise to the correlation function depicted in FIG. 5. As illustrated, the direct line-of-sight path between base station or sector 102 and subscriber station 100 is blocked by an obstruction 614 (a tree in the example), which attenuates but still allows passage of the pilot signal. At the same time, due to multi-path, the same pilot signal may reflect off of another obstruction 616 (a building in the example) and be received by the subscriber station 100 with less attenuation than the direct line-of-sight arrival. This reflection from obstruction 616 might give rise to the correlation function represented in FIG. 5 with a solid line, while the direct line or sight rendering through obstruction 614 might give rise to the correlation function represented in FIG. 5 with a dashed line.

Turning back to FIG. 5, the multi-path condition compounds the difficulty of locating the earliest non-sidelobe peak of the correlation function, which, in FIG. 5, is the peak identified with numeral 512. The reason is that this peak may be difficult to distinguish from the sidelobes of the correlation function representing the reflected signal in FIG. 6, which sidelobes are identified with numeral 518. Accordingly, there will be a risk that the analysis logic in the parameter estimator will either erroneously interpret such a sidelobe as the peak of the correlation function for the line of sight arrival, or would erroneously interpret the peak of this correlation function as a sidelobe from a later in time arrival. Either way, the ensuing time-of-arrival estimate will be skewed.

Figure 7:
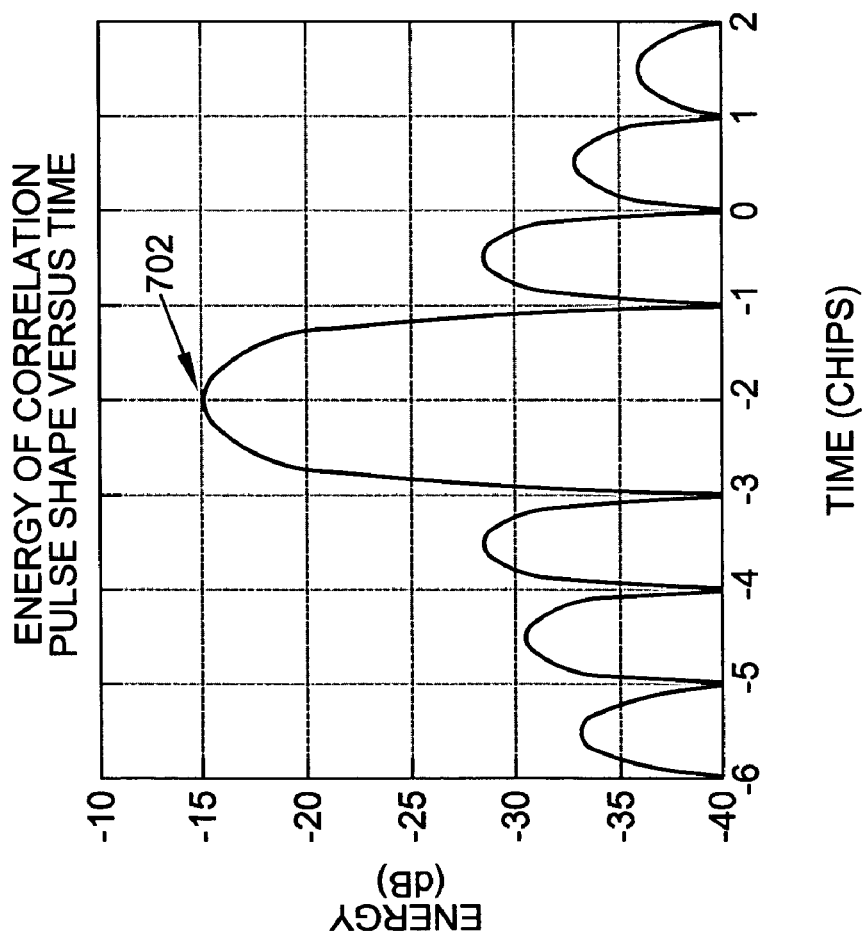
FIG. 7 is a time domain representation of an example of a correlation function for a CDMA pilot signal subject to a non line of sight condition.
Figure 8:
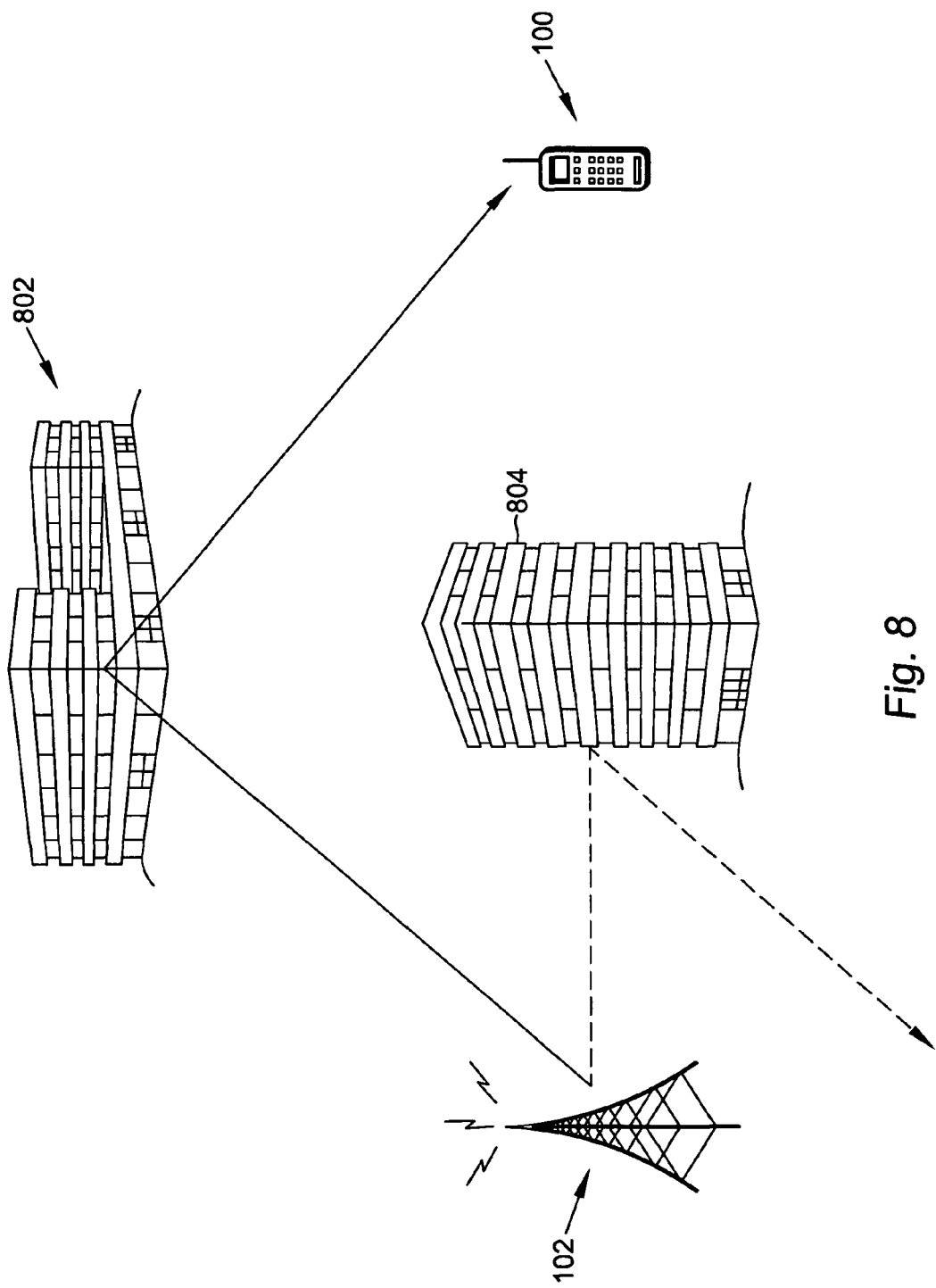
FIG. 8 illustrates an example scenario which might give rise to the correlation function of FIG. 7.

FIG. 7 depicts an example of a correlation function derived from a pilot signal in a CDMA wireless communications system which reflects the effects of a non-line of sight condition, such as might result from the scenario depicted in FIG. 8. There, as illustrated, obstruction 804 completely blocks a line of sight transmission from base station 102 to subscriber station 100. However, a non-line of sight transmission from base station 102 reflects off building 802 and is received at subscriber station 100. This non-line of sight transmission gives rise to the correlation function depicted in FIG. 7.

Here, an accurate estimate of time-of-arrival is difficult to obtain since a peak corresponding to a line of sight transmission is not present in the correlation function. Moreover, since peak 702 is the earliest non-sidelobe peak depicted in FIG. 7, there is a risk that the analysis logic will use the time/distance associated with peak 702 in determining a time-of-arrival estimate for the pilot. Since this peak is not associated with a line of sight transmission, the time-of-arrival estimate will be skewed.

Figure 9:
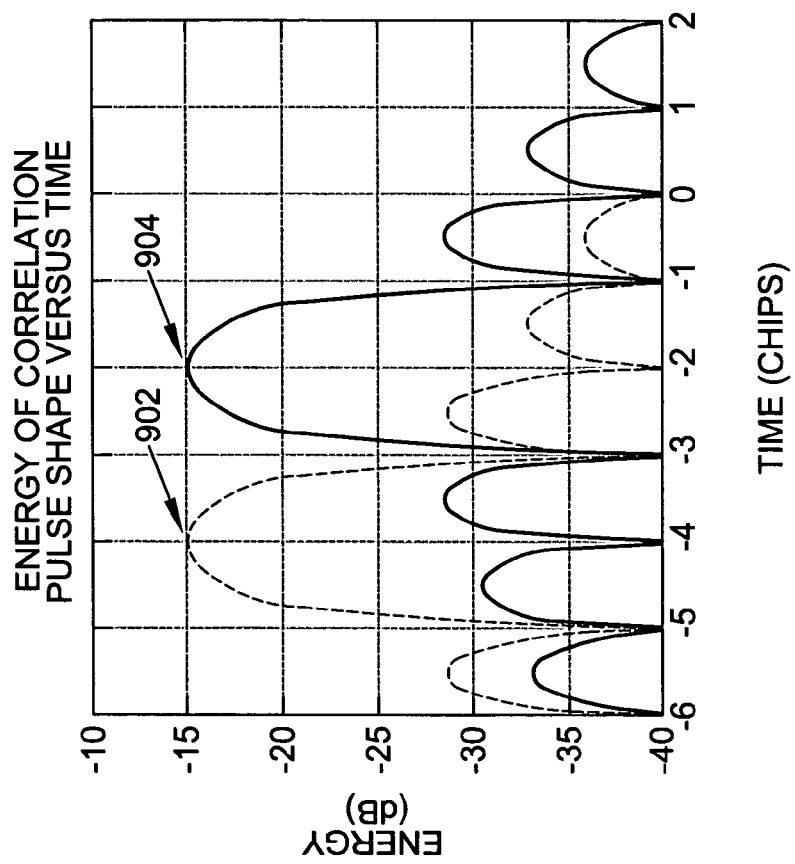
FIG. 9 is a time domain representation of an example of a correlation function for a CDMA pilot signal subject to multi-path and non line of sight conditions.
Figure 10:
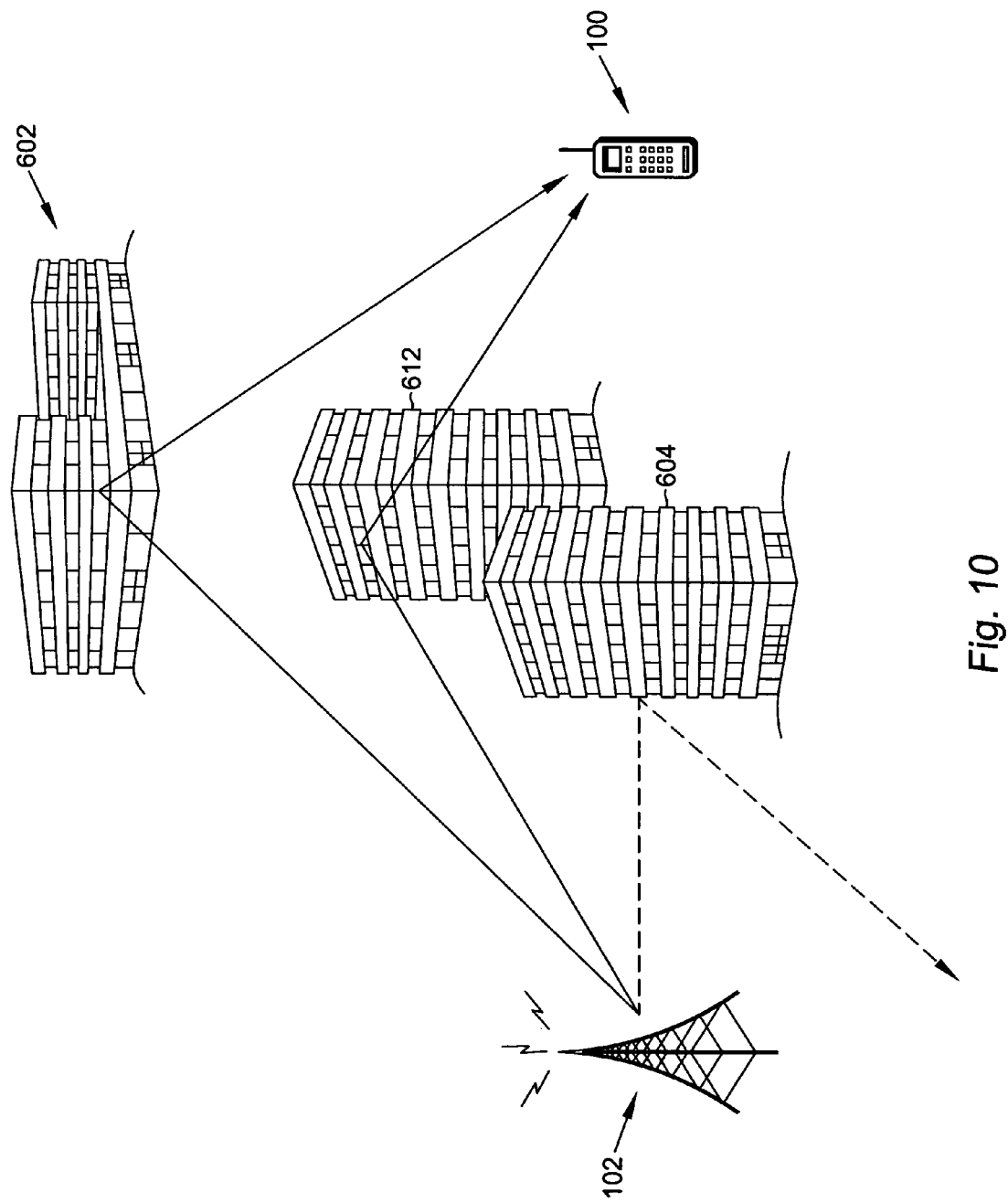
FIG. 10 illustrates an example scenario which might give rise to the correlation function of FIG. 9.

FIG. 9 illustrates a correlation function reflecting a combination of multi-path and line-of-sight conditions which might result in a CDMA wireless communications system. FIG. 10 illustrates an example of a scenario which might give rise to the correlation function illustrated in FIG. 9. As illustrated, a line of sight transmission from base station 102 to subscriber station 100 is completely blocked by building 604. However, two reflected transmissions from base station 102 are received at subscriber station 100. The first, which is reflected off of building 612, is the earlier-in-time arrival and is assumed to give rise to the peak 902 illustrated in phantom in FIG. 9. The second, which is reflected off of building 602, is the later-in-time arrival and is assumed to give rise to the peak 904 illustrated in FIG. 9.

Here, an accurate estimate of time-of-arrival is again difficult to obtain since a peak corresponding to a line-of-sight transmission is not present in the correlation function. Moreover, since peak 902 is the earliest non-sidelobe peak, there is a risk the analysis logic will use the time/distance associated with it in estimating time-of-arrival. Since this peak does not correspond to a line-of-sight transmission, the time of analysis estimate will accordingly be skewed.

Embodiments of the Invention

The invention provides a method of deriving a position estimate of a receiver from a plurality of parameter measurements. Each of the parameter measurements is derived from a correlation function, which in turn is derived by correlating a signal received at the receiver with an identification code uniquely identifying a transmitter visible to the receiver.

Figure 11B:
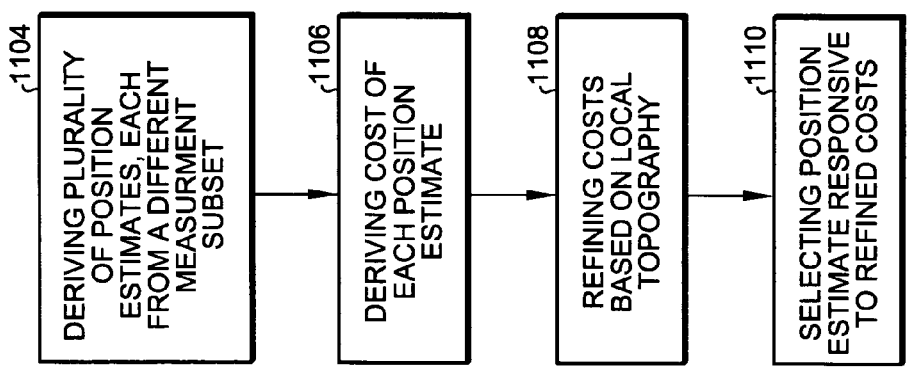
FIG. 11B is a simplified flowchart illustrating a second embodiment of a method according to the invention in which a position estimate is selected responsive to refined costs determined based on local topography for a plurality of position estimates.
Figure 11A:
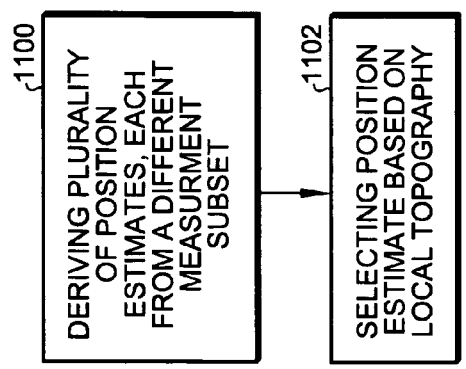
FIG. 11A is a simplified flowchart illustrating a first embodiment of a method according to the invention in which a position estimate is selected based on local topography.

Referring to FIG. 11A, a first embodiment of the method is illustrated. In step 1100, this embodiment of the method comprises deriving a plurality of position estimates, each from a different subset of the plurality of measurements. From step 1100, the method proceeds to step 1102. There, one of the position estimates is selected based on local topography.

A second embodiment of the method is illustrated in FIG. 11B. As illustrated, this embodiment of the method begins with step 1104, which comprises deriving a plurality of position estimates, each from a different (although possibly overlapping) subset of the plurality of measurements which have been obtained. For example, if six measurements A, B, C, D, E, and F have been obtained, step 1104 might comprise deriving six position estimates from each the following measurement subsets: 1)A,B,C,D,E; 2)A,B,C,D,F; 3)A,B,C,E,F; 4)A,B,D,E,F; 5)A,C,D,E,F; 6) B,C,D,E,F.

From step 1104, the method proceeds to step 1106, which comprises deriving the cost of each of the position estimates determined in step 1104. For purposes of this disclosure, the "cost" of an estimate is any measure of the consistency of the measurements used in deriving that estimate, and includes, but is not limited to, the RMS of the residual measurement errors.

From step 1106, the method proceeds to step 1108, which comprises refining each of the costs determined in step 1104 based on local topography.

In one implementation, each cost is refined using the following process. First, one of the measurements used to derive the corresponding position estimate is selected, and a database representing the local topography is accessed to identify any obstacles in the path of the line of sight transmission from the corresponding reference source and the receiver. Optionally, any obstacles which may give rise to reflected transmissions at the receiver are also identified. From this information, the expected correlation function for the reference source is derived and compared to the actual correlation function which is obtained. Based on this comparison, the cost for the estimate as determined in step 1106 might be adjusted. This process is repeated for each of the measurements used to derive the position estimate. The result is the refined cost for the position estimate.

In one implementation example, the obstacles to a line of sight transmission are identified, and the expected amount of attenuation at the receiver from a line of sight transmission from the reference source is determined. From this information, the expected peak amplitude for the correlation function resulting from the line of sight transmission is then determined and compared with the amplitude of the earliest non-sidelobe peak of the actual correlation function. If there is a divergence, the cost may be adjusted upwards, with the amount of the adjustment depending on the degree of divergence. If there is a match or a near match, the cost may be adjusted downwards or kept the same. This process is repeated for each of the measurements from which the position estimate is derived. The result is the refined cost for the position estimate.

Consider, for example, the situation where the actual peak amplitude exceeds the expected peak amplitude. Here, a multi-path condition could be present. Hence, the cost might be increased to reflect that. As another example, consider a situation where the actual peak amplitude is less than expected. Here, unexpected obstacles could be present in the line of sight path from the transmitter. Hence, the cost might be increased to reflect that.

In a second implementation example, the expected shape of the correlation function from a line of sight transmission is estimated based on consideration of the obstacles expected to be present in a line of sight transmission. The estimated shape could also reflect the expected effects of multi-path based on consideration of obstacles expected to provide reflected transmissions to the receiver. Once determined, the estimated shape is compared with the actual shape. Again, the cost could be adjusted in response to the comparison. As before, this process would be repeated for each of the measurements from which the position estimate is derived. The result is the refined cost for the position estimate.

Turning back to FIG. 11B, from step 1108, the method proceeds to step 1110. In step 1110, a position estimate is selected responsive to refined costs. In one example, this step comprises selecting the position estimate with the lowest refined cost.

FIG. 12 illustrates a third embodiment of the method of the invention. In this embodiment, the method begins with step 1204, which comprises excluding any unreliable measurements (from the plurality of measurements which have been obtained) based on consideration of local topography.

In one implementation, this step comprises accessing, for each measurement, a database representing local topography to identify any obstacles expected to be present is a line of sight transmission from the corresponding transmitter and/or expected to give rise to a reflected transmission at the receiver. Responsive to this information, the expected correlation function for the transmitter is computed and compared with the actual correlation function. Responsive to this comparison, the measurement is either excluded as unreliable, or retained.

In one implementation example, the expected attenuation of a line of sight transmission from the transmitter is computed, and the expected amplitude of the correlation function resulting from the line of sight transmission derived therefrom. This estimate is compared with the amplitude of the earliest non-sidelobe peak in the actual correlation function. If there is a significant enough divergence, the measurement may be rejected as unreliable.

In a second implementation example, the expected shape of the correlation function for the transmitter is computed and compared to the shape of the actual correlation function. Based on this comparison, the measurement may be rejected as unreliable.

Turning back to FIG. 12, from step 1204, the method proceeds to step 1206. In step 1206, the method comprises deriving position estimates from different subsets of the remaining measurements. From step 1206, the method proceeds to step 1208, which comprises deriving costs for each of these position estimates. From step 1208, the method proceeds to step 1210, which comprises selecting one of the estimates based on the costs. In one implementation, this step comprises selecting as the best estimate the position estimate with the lowest cost.

FIG. 13 illustrates a fourth embodiment of the method of the invention. In this embodiment, the method begins with step 1304, which comprises deriving a plurality of position estimates, each from a different subset of the measurements which have been obtained.

From step 1304, the method proceeds to step 1306, which comprises using local topography to compute reliability metrics for each of the position estimates derived in step 1304.

From step 1306, the method proceeds to step 1308, which comprises selecting a position estimate as the best estimate responsive to the reliability metrics determined in step 1304.

The reliability metrics may represent a proportional or inversely proportional measure of the reliability of the corresponding position estimate. In the case where the reliability metric is directly proportional to the reliability of the position estimate, step 1308 may comprise selecting as the best estimate the position estimate with the largest reliability metric. In the case where the reliability metric is an inverse measure of the reliability of the position estimate, step 1308 may comprise selecting as the best estimate the position estimate with the smallest reliability metric.

In one implementation, step 1306 comprises accessing, for each measurement used to derive a position estimate, a database representative of local topography to identify any obstacles in a line of sight transmission from the corresponding transmitter and/or any obstacles which could result in reflected transmissions at the receiver. Responsive to this information, the expected correlation function for the transmitter is obtained and compared with the actual correlation. Responsive to this comparison, the reliability metric for the estimate may be adjusted. This process is repeated for each of the measurements from which a position estimate is derived. The result is a reliability metric for the position estimate. In like manner, the reliability metric for each of other position estimates is derived.

In one example, for each measurement used to compute a position estimate, the database is accessed to identify any obstacles in a line of sight transmission from the transmitter. From this information, the expected attenuation in a line of sight transmission from the corresponding transmitter is estimated, and the expected peak amplitude of the correlation function for the line of sight transmission determined. The expected peak amplitude is compared with the amplitude of the earliest non-sidelobe peak in the actual correlation function, and the reliability metric for the estimate adjusted accordingly. For example, if the comparison indicates a multi-path or non-line of sight condition is present or likely, the reliability metric could be adjusted upwards or downwards, depending upon if the metric is an inverse or proportional measure of reliability. In another example, for each measurement, the comparison involves comparing the expected and actual shape of the corresponding correlation function and adjusting the correlation function accordingly.

Again, this process is repeated for each of the measurements from which the position estimate is derived, thus yielding the reliability metric for the estimate. This overall process is then repeated for each of the estimates obtained in step 1304 to yield reliability indices for all the estimates.

Figure 14:
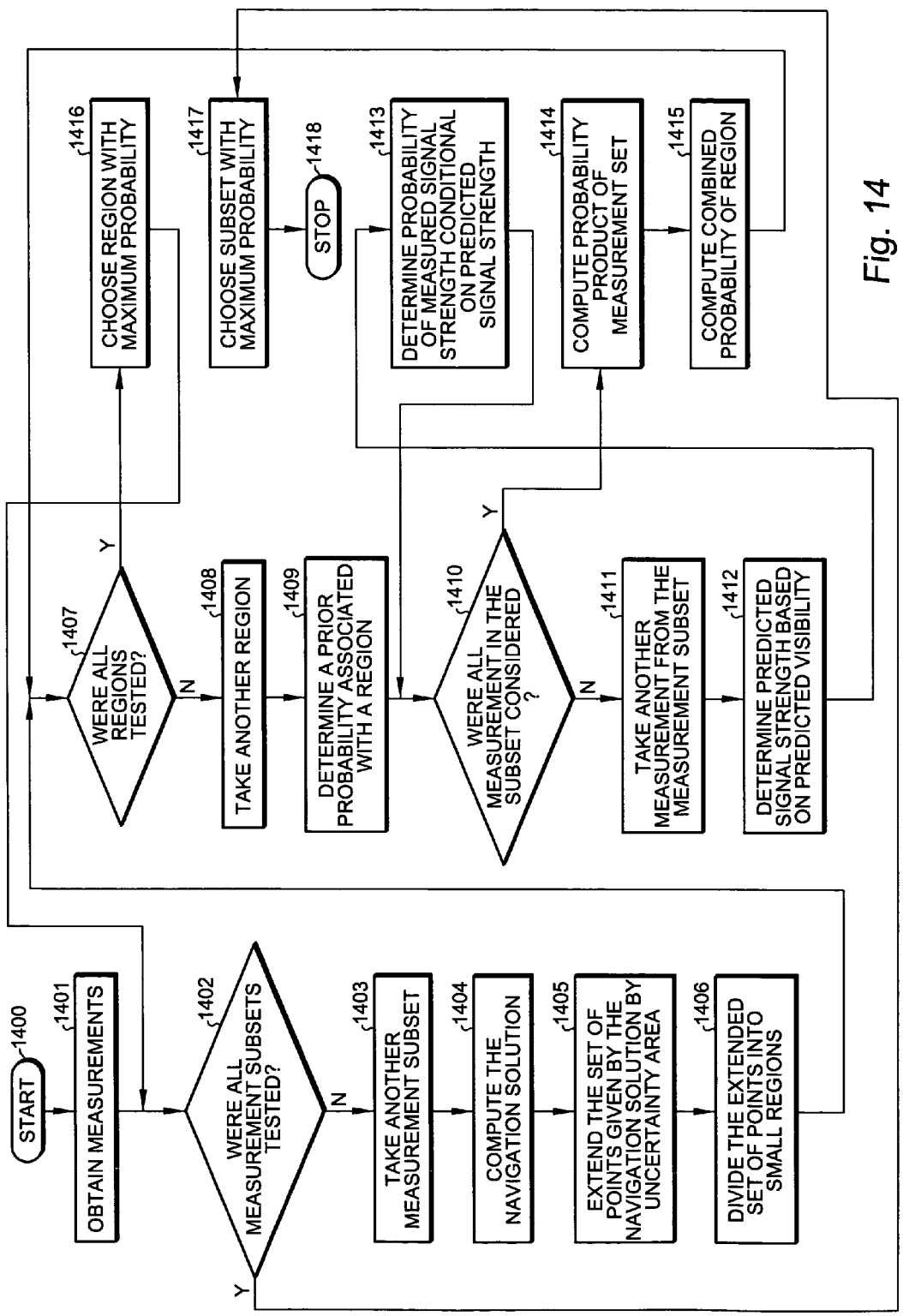
FIG. 14 is a flowchart illustrating an implementation example of a method according to the invention.

FIG. 14 illustrates an implementation example of the method of the invention.

The process starts with task 1400 and proceeds to task 1401.

In task 1401, a set of measurements is obtained. The elements of the measurement set include measurements from a number of reference points, for example GPS satellites, cellular base stations, cellular terrestrial measurements, etc. Elements of the measurement set may also represent multiple measurements for any given reference point. This may involve multiple independent or correlated measurements, or multiple hypotheses for a single measurement, such as multiple correlation peaks. Each measurement can be provided with a weighting factor, such as an RMS error estimate.

From task 1401, the method proceeds to task 1402. Task 1402 queries whether all possible suitable subsets of the measurement set have been taken. A suitable subset would contain sufficient number of independent measurements to derive position solution(s). The solution does not need to be fully determined. A suitable subset typically does not contain measurements that are known to be inconsistent, such as multiple correlation peaks.

If the answer is no, control passes to task 1403. In task 1403, a subset is selected.

Task 1404 follows task 1403. In task 1404, a position solution is computed by using a suitable navigation algorithm. The navigation algorithm may use the measurement weighting factors in the computation. The output of the navigation algorithm may be a single point in the case of a fully determined or over-determined solution, or a finite set of points if ambiguous solutions exist, or even an infinite set of points in the case of an under-determined solution. An example for the latter is when pseudo-range measurements for three GPS satellites are used, in which case the solution will be a set of points forming a curve. Such sets of points should be delimited by using appropriate hypotheses. For example, a non-horizontal curve can be delimited by a certain height interval assumption (altitude aiding). The extent of the limit is determined by a trade-off between computational time and required reliability.

Task 1405 follows task 1404. In task 1405, the set of points determined in task 1404 is extended, as dictated by inherent measurement uncertainties. Each solution point is typically extended to an uncertainty ellipsoid. The parameters describing the ellipsoid are results of the navigation algorithm, and are dependent on the individual measurement RMS estimates and the geometry of the reference points. If the navigation solution yielded more than one point, then the combined extension is determined as the union of the uncertainty areas assigned to every point.

Task 1406 follows task 1405. In task 1406, the extended set derived in task 1405 is divided into regions. Each region is represented by its geometric center in the algorithm hereinafter. The size of the regions is governed by a trade-off between computational time and required accuracy.

From task 1406, control passes to task 1407. In task 1407, a query is made whether all regions were tested.

If the answer is no, task 1408 is performed. In task 1408, a region is selected.

Task 1409 follows task 1408. Task 1409 determines an a priori probability associated with the selected region. The a priori probability is computed based on:

1. Information about the particular location pertaining to the region. This encompasses all a priori knowledge of the local environment. For example, if a region has had more frequent location requests associated with it in the past, it should have a higher assigned probability. Also, if an underdetermined solution was used in task 1404, then, when delimiting the resulting infinite set of points, the resulting set typically doesn't have a uniform probability distribution. For example, if altitude aiding was used, then typically the probability is less at the extrema of the altitude range than at the middle.

2. Location of the region relative to the navigation solution. When extending the solution in task 1405, the uncertainty region has a certain probability distribution associated with it (for example, a 3-D Gaussian distribution for an uncertainty ellipsoid), which can be used as a factor in the a priori probability of the region. If the navigation solution yielded more than one point, then a particular region can be in the uncertainty region of a number of solution points. In this case, the combined probability is computed based on conditional probability rules.

3. The sum of the weights of the measurements used in the navigation algorithm

4. The cost given by the navigation algorithm for the solution

Task 1410 follows task 1409. In task 1410, a query is made whether all measurements of the measurement subset chosen in task 1403 have been considered.

If no, task 1411 is performed. In task 1411, a measurement is selected.

Task 1412 follows task 1411. In task 1412, a predicted receive signal strength is calculated. The calculation is based on the knowledge of the receiver location (which is the center of the region selected in task 1408), the location of the signal source (can be determined, for example, from the Ephemeris and possibly differential corrections for GPS satellites), and also on the knowledge of local topography. After drawing a line of sight from the receiver location to the signal source location, any possible obstacles can be identified. Based on the type of the obstacle and the length of the path blockage, an obliquity factor is determined and incorporated in an expected attenuation value. Knowledge of local topography can include knowledge of architectural objects, as well. For example, if the path is blocked by a building, great signal attenuation should be expected. The attenuation can be modeled as highly 'non-linear'. For example, if the required penetration depth of the signal inside the building is small, then a receiver close to a window, receiving the signal through the window can be assumed, which would mean small signal loss. The same receiver would be expected to see a much greater signal loss if the signal source's location is diagonally opposite, because then the signal would have to propagate through internal building structure. These assumptions can be easily captured in a 'non-linear' path-loss model, where a long path blockage would have an even greater expected attenuation compared to a short path blockage than what a homogeneous model would suggest. Along with the expected attenuation, an estimation error RMS estimate is calculated. If the path crosses multiple objects, then a combined signal attenuation and combined RMS is calculated.

The attenuation also includes free space propagation loss, which can be calculated since the assumed receiver-to-signal source distance is known.

Note that since the receiver typically sees cellular base stations at low elevation angles, it may be beneficial to approximate the attenuation for cellular base stations by simply using a generic attenuation vs. receiver-to-signal source distance function. The function can be chosen based on knowledge of the environment or based on collected statistical data. For satellites that are seen typically at higher elevations, the particular path and the expected blockage should be used in the calculations.

Once the expected attenuation is determined, it is multiplied by the nominal source power to obtain the expected receive signal strength. For satellites the nominal source power is known, for cellular base stations, it can possibly be read from overhead messages broadcast by the base station. In the absence of such a broadcast, an estimate can be used. Any uncertainty in the source power should be reflected in the receive signal strength RMS error estimate.

From task 1412, control passes to task 1413. In task 1413, the actual receive signal strength and the predicted receive signal strength is compared, and a conditional probability is computed. A low probability could be the result of either seeing a signal with a much greater power than expected, which would indicate that the detected signal is probably a multi-path (since the line-of-sight signal is expected to be blocked); or seeing a signal with much less power than expected. In either case, the confidence in the region selected in task 1408 (and being the location where the measurement selected in task 1411 is taken) is low.

If the query in task 1410 indicates that all measurements in the subset selected in task 1403 have been considered, a combined probability is computed in task 1414. This computation is based on the results obtained in task 1413.

From task 1414, control passes to task 1415. In task 1415, a combined probability is computed, based on the results of tasks 1409 and 1414, and control then passes back to task 1407.

Once the query in task 1407 indicates that all regions have been tested, task 1416 is performed. There, the region for which the maximum probability was computed in task 1415 is selected and recorded. The geometric center of the recorded region will be the location solution associated with the measurement subset selected in task 1403, and the probability of the region will be the probability assigned to the measurement subset. From task 1416, control passes back to task 1402.

If the query in step 1402 indicates that all measurement subsets have been tested, task 1417 is performed. There, the measurement subset with the highest probability is selected, and the associated location is declared the position solution.

The process then exits at task 1418.

Not all steps described above are required for operation. If certain sets of information are not available, then the corresponding steps may be omitted.

Any of the foregoing methods may be tangibly embodied in a variety of forms, including but not limited to, a form where a series of instructions embodying the method is stored on or in a memory or a server in a computer network such as the Internet, where the method is embodied as synthesized logic, or where the method is embodied as a computer program product, i.e., a code segment or module.

Furthermore, systems are possible comprising a processor configured to access a memory embodying any of the foregoing methods to obtain and execute the instructions stored thereon. Such a system may be used in a variety of environments or applications. For example, in one application, such a system is situated in a subscriber station and is configured to locate the position of the subscriber station from one or more transmissions from base stations, sectors, GSP satellites, or any combination thereof. In another application, such a system is situated in a position determination entity (PDE), and is configured to locate the position of a subscriber station which obtains measurements from one or more transmissions from base stations, sectors, GPS satellites, or any combination thereof, and provides them to the PDE, which then determines an estimate of the position of the subscriber station.

For purposes of this disclosure, a "processor" may be any device capable of executing a series of instructions embodying a process, including but not limited to a computer, microprocessor, an ASIC, finite state machine, DSP, or some other mechanism.

Moreover, as used herein, a "memory" may be any device readable by a processor and capable of storing a series of instructions embodying a process, including but not limited to RAM, ROM, EPROM, EEPROM, PROM, disk (hard or floppy), CD-ROM, DVD, flash memory, etc.

Figure 15:
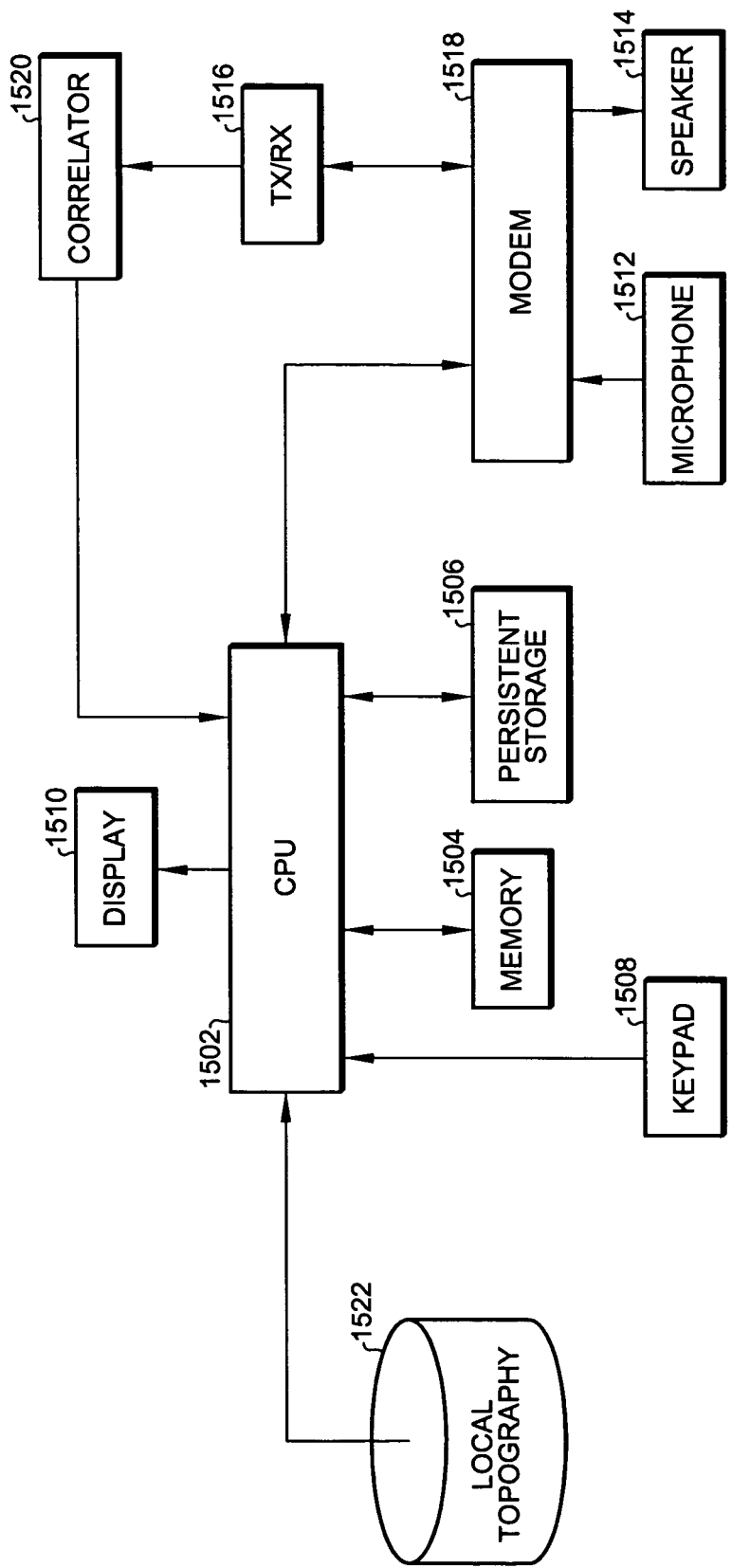
FIG. 15 is a simplified block diagram of a subscriber station.

Referring to FIG. 15, a simplified block diagram of one example implementation of a subscriber station is illustrated. In this particular example, numeral 1502 identifies a processor configured to execute software instructions, and numeral 1504 identifies a memory for holding software instructions and data, including software instructions embodying the method of the invention.

Numeral 1506 is persistent storage for holding provisioning information useful for roaming and/or system registration and de-registration.

Numerals 1508 and 1510 identify, respectively, a keypad and display, and are typically provided as part of a user interface.

Numerals 1512 and 1514 identify, respectively, a microphone and speaker, and are typically provided to support uses involving transceiving voice.

Numeral 1516 identifies a radio capable of receiving and transmitting information at RF frequencies over a wireless interface according to one or more multiple access protocols, such as but not limited to CDMA, GSM, WCDMA, AMPS, TDMA, PCS, or combinations thereof.

Numeral 1518 identifies a modem, which is capable of upconverting voice (and data) at baseband frequencies to RF frequencies, and downconverting RF frequencies to baseband frequencies.

Numeral 1520 identifies a correlator, which is configured to derive a correlation function from a received signal in the manner previously described.

Numeral 1522 identifies a database representative of local topography, which is accessible by processor 1502.

In this particular example, measurements are derived by processor 1502 from the correlation functions provided by correlator 1520. Processor 1502 then executes the software instructions stored in memory 1504, while accessing database 1522, to perform the method of the invention. At the conclusion of this process, an estimate of the position of the subscriber station is determined.

When the technique represented by any of these embodiments, implementations or examples is applied to measurements or position estimates derived from such measurements, performance is greatly improved since distortions caused by factors such as multi-path and lack of line of sight may now be accurately accounted for.

While various embodiments of the invention have been described, it will be apparent to those of ordinary skill in the art that many more embodiments and implementations are possible that are within the scope of this invention.

What is claimed is:

1. A method of deriving a position estimate of a receiver from a plurality of parameter measurements, each of the plurality of parameter measurements measured concurrently at the receiver and derived from a respective actual correlation function that is derived by correlating a signal received at the receiver with an identification code uniquely identifying a corresponding transmitter, comprising:

deriving a plurality of different estimates of a current position of the receiver, at least two of the plurality of different estimates of the current position of the receiver being derived with the same type of position-determination scheme, each of the different estimates derived from a subset of the plurality of parameter measurements, each of the plurality of parameter measurements measured by the receiver and each respective position estimate derived from a subset of the plurality of the parameter measurements that is different from other subsets of the plurality of parameter measurements used to derive other of the plurality of estimates of the current position of the receiver;

deriving a cost of each of the position estimates;

refining the costs based on local topography; and selecting one of the position estimates responsive to the refined costs.

2. The method of claim 1 wherein the parameter measurements are time-of-arrival measurements.

3. The method of claim 1 wherein the identification code is a pseudo noise (PN) code.

4. The method of claim 1 wherein the derived costs are an RMS value of residual errors of measurements used in deriving the current position estimate for respective measurement subsets.

5. The method of claim 1 wherein the refining step comprises performing the following for each measurement:

estimating, based on local topography, an expected correlation function for said corresponding transmitter;

comparing the estimated expected correlation function with the actual correlation function; and adjusting, based on the comparison, a cost for each of the position estimates derived from the respective measurement, if the divergence between the expected and actual correlation function is sufficiently great.

6. The method of claim 5 wherein said comparing comprises comparing an expected peak amplitude with an amplitude of an earliest non-sidelobe peak of the actual correlation function.

7. The method of claim 5 wherein said comparing comprises comparing an expected shape of the actual correlation function with an actual shape of the expected correlation function.

8. The method of claim 1 tangibly embodied as a series of instructions stored in a memory.

9. The method of claim 1, wherein two or more of the subsets include one or more overlapping parameter measurements.

10. The method of claim 1, wherein each signal that is used to derive the plurality of parameter measurements is received within a predetermined search window used for location estimation of the receiver at a single point in time.

11. The method of claim 1, wherein each signal that is used to derive the plurality of parameter measurements is either (i) received from a different corresponding transmitter than each other signal or (ii) based on a same transmission from a same corresponding transmitter as another signal.

12. The method of claim 1, wherein the type of position-determination scheme used to derive the at least two of the plurality of different estimates corresponds to (i) a Global Positioning System (GPS) scheme, (ii) an Advanced Forward Link Trilateration (AFLT) scheme or (iii) a hybrid position-determination scheme that includes a combination of the GPS and AFLT schemes.

13. The method of claim 1, wherein the respective subsets of the plurality of parameter measurements correspond to different combinations of the concurrently measured parameters that are used as inputs into the same type of position-determination scheme in order to generate the different estimates for the current position over the receiver.

14. A system for deriving a position estimate of a receiver from a plurality of parameter measurements, each of the plurality of parameter measurements measured concurrently at the receiver and derived from a respective actual correlation function that is derived by correlating a signal received at the receiver with an identification code uniquely identifying a corresponding transmitter, comprising:
   first logic for deriving, from the plurality of measurements, a plurality of different estimates of a current position of the receiver, at least two of the plurality of different estimates of the current position of the receiver being derived with the same type of position-determination scheme, each different position estimate derived from a subset of the plurality of parameter measurements, each of the plurality of parameter measurements measured by the receiver and each respective position estimate derived from a subset of the plurality of parameter measurements that is different than other subsets of the plurality of parameter measurements used to derive other of the plurality of estimates of the current position of the receiver;
   second logic for deriving a cost of each of the position estimates;
   third logic for refining the costs based on, local topography; and
   fourth logic for selecting one of the derived position estimates responsive to the refined costs.

15. The system of claim 14 wherein the parameter measurements are time-of-arrival measurements.

16. The system of claim 14 wherein the identification code is a pseudo noise (PN) code.

17. The system of claim 14 wherein the derived costs are an RMS value of residual errors of measurements used in deriving the current position estimate for respective measurement subsets.

18. The system of claim 14 wherein the third logic is configured, for each measurement from which a current position estimate is derived, to (a) estimate, based on local topography, an expected correlation function for the corresponding transmitter;
   (b) compare the estimated expected correlation function with the actual correlation function; and
   (c) adjust, based on the comparison, a cost for each of the position estimates derived from the respective measurement, if a divergence between the expected and actual correlation functions is sufficiently great.

19. The system of claim 18 wherein the third logic is configured to compare an expected peak amplitude of the correlation function with an amplitude of the earliest non-sidelobe peak of the actual correlation function.

20. The system of claim 18 wherein the third logic is configured to compare an expected shape of the correlation function with an actual shape of the expected correlation function.

21. A non-transitory computer-readable medium comprising instructions, which, when executed by a receiver configured to measure a plurality of parameter measurements, each of the plurality of parameter measurements measured concurrently at the receiver and derived from a respective actual correlation function that is derived by correlating a signal received at the receiver with an identification code uniquely identifying a corresponding transmitter, cause the receiver to perform operations, the instructions comprising:
   program code to derive a plurality of different estimates of a current position of the receiver, at least two of the plurality of different estimates of the current position of the receiver being derived with the same type of position-determination scheme, each of the different estimates derived from a subset of the plurality of parameter measurements, each of the plurality of parameter measurements measured by the receiver and each respective position estimate derived from a subset of the plurality of the parameter measurements that is different from other subsets of the plurality of parameter measurements used to derive other of the plurality of estimates of the current position of the receiver;
   program code to derive a cost of each of the position estimates;
   program code to refine the costs based on local topography; and
   program code to select one of the position estimates responsive to the refined costs.

22. A system for deriving a position estimate of a receiver from a plurality of parameter measurements, each of the plurality of parameter measurements measured concurrently at the receiver and derived from a respective actual correlation function that is derived by correlating a signal received at the receiver with an identification code uniquely identifying a corresponding transmitter, comprising:
   means for deriving a plurality of different estimates of a current position of the receiver, at least two of the plurality of different estimates of the current position of the receiver being derived with the same type of position-determination scheme, each of the different estimates derived from a subset of the plurality of parameter measurements, each of the plurality of parameter measurements measured by the receiver and each respective position estimate derived from a subset of the plurality of the parameter measurements that is different from other subsets of the plurality of parameter measurements used to derive other of the plurality of estimates of the current position of the receiver;
   means for deriving a cost of each of the position estimates;
   means for refining the costs based on local topography; and
   means for selecting one of the position estimates responsive to the refined costs.

* * * * *